(12) United States Patent
Tamura et al.

(10) Patent No.: US 8,416,681 B2
(45) Date of Patent: Apr. 9, 2013

(54) NETWORK SYSTEM

(75) Inventors: Yukihisa Tamura, Yokohama (JP);
Masatoshi Shibasaki, Yokohama (JP);
Mitsuru Asayama, Yokohama (JP);
Tsutomu Kawaizumi, Funabashi (JP);
Kenji Okamoto, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 263 days.

(21) Appl. No.: 13/013,445

(22) Filed: Jan. 25, 2011

(65) Prior Publication Data

US 2011/0214008 A1 Sep. 1, 2011

(30) Foreign Application Priority Data

Feb. 26, 2010 (JP) ................................ 2010-041276

(51) Int. Cl.
*H04J 1/16* (2006.01)
(52) U.S. Cl.
USPC .......................................... 370/218; 370/220
(58) Field of Classification Search .......... 370/216–224, 370/392
See application file for complete search history.

(56) References Cited

U.S. PATENT DOCUMENTS

| | | | | |
|---|---|---|---|---|
| 7,043,541 B1 * | 5/2006 | Bechtolsheim et al. | ...... | 709/223 |
| 7,213,178 B1 * | 5/2007 | Prasad et al. | ...... | 714/43 |
| 7,570,643 B2 * | 8/2009 | Prasad et al. | ...... | 370/392 |
| 7,606,886 B1 * | 10/2009 | Bechtolsheim et al. | ...... | 709/223 |
| 8,199,639 B2 * | 6/2012 | Doukai et al. | ...... | 370/228 |
| 8,218,434 B1 * | 7/2012 | Brown et al. | ...... | 370/227 |
| 2003/0198182 A1 * | 10/2003 | Pegrum et al. | ...... | 370/225 |
| 2005/0185577 A1 * | 8/2005 | Sakamoto et al. | ...... | 370/218 |
| 2007/0086333 A1 * | 4/2007 | Doukai et al. | ...... | 370/228 |
| 2012/0147741 A1 * | 6/2012 | Wei | ...... | 370/225 |
| 2012/0294141 A1 * | 11/2012 | Ao et al. | ...... | 370/218 |
| 2012/0300619 A1 * | 11/2012 | Fu et al. | ...... | 370/222 |

OTHER PUBLICATIONS

ITU-T G.707/Y.1322; Network node interface for the synchronous digital hierarchy (SDH); Dec. 2003; pp. i-v, 1-182.
Synchronous Optical Network (SONET) Transport Systems; Common Generic Criteria; Telcordia Technologies, GR-253-CORE, Issue 3, Sep. 2000; pp. i-xxvi and 1-1 to ROI-12.

\* cited by examiner

*Primary Examiner* — Andrew Lee
(74) *Attorney, Agent, or Firm* — Foley & Lardner LLP (57) ABSTRACT

A network system having duplicate lines of a primary system and a backup system between a transmitter apparatus and a receiver apparatus is provided. Each of the transmitter apparatus and the receiver apparatus includes an arithmetic operator for conducting a BIP-8 arithmetic operation and a CRC arithmetic operation on an input signal and thereby detecting a bit error. The transmitter apparatus transmits data to both lines. The receiver apparatus includes a switcher. When a bit error is detected in received data of the primary system. the switcher switches control of the primary system and the backup system. Hitless protection switching of a VC path is executed.

14 Claims, 12 Drawing Sheets

FIG. 1

STM-N/ OC-3N FRAME FORMAT

FIG. 2
VC-3 FRAME FORMAT

FIG. 4
PROVIDING VC-3 IN STM-1 WITH CRC ARITHMETIC OPERATION

FIG. 5
PROVIDING VC-4 IN STM-1 WITH CRC ARITHMETIC OPERATION

FIG. 6

FIG. 7 RECEIVER APPARATUS

FIG. 8
REDUNDANT CONFIGURATION IN MPLS NETWORK

FIG. 9
MPLS PACKETIZATION OF VC-3

FIG. 10
IWF HEADER FORMAT OF MPLS PACKET

| byte | b7 | b6 | b5 | b4 | b3 | b2 | b1 | b0 |
|---|---|---|---|---|---|---|---|---|
| 1 | pointer flag | path size | | | | | | |
| 2 | AU# | | | | | | | |
| 3 | Sequence number (2octets) | | | | | | | |
| 4 | | | | | | | | |

FIG. 11
IWF HEADER CONTENTS OF MPLS PACKET

| # | NAME | CONTENTS |
|---|---|---|
| 1 | pointer flag | WHETHER AU POINTER IS INCLUDED IS INDICATED |
| 2 | path size | VC PATH SIZE (VC-3/ VC-4) IS INDICATED |
| 3 | AU# | NUMBER OF VIRTUAL VC-3 AT THE TIME OF VC-4 IS INDICATED |
| 4 | Sequence number | SEQUENCE NUMBER IS PROVIDED EVERY PATH SIZE SEQUENCE NUMBER IS INCREMENTED BY 1 EVERY PACKET AND RETURNS TO 0x0 AFTER 0xFFFF |

FIG. 12
MPLS PACKETIZATION OF VC-4

NETWORK SYSTEM

INCORPORATION BY REFERENCE

The present application claims priority from Japanese application JP2010-041276 filed on Feb. 26, 2010, the content of which is hereby incorporated by reference into this application.

BACKGROUND OF THE INVENTION

The present invention relates to a VC path switching method for monitoring bit errors in a VC (Virtual Container) path in a communication network and switching from a primary line to a backup line, and an apparatus using this method.

Conventionally, a redundant configuration which prevents communication interruption by arranging a primary line and a backup line and switches to the backup line when a fault has occurred has been used in the communication field to ensure the reliability.

A hitless protection switching method which generates neither missing of transmission data nor bit errors when switching to the backup line has been proposed.

In a VC path prescribed by SDH/SONET (Synchronous Digital Hierarchy/Synchronous Optical Network) (for example, "ITU-T G 707 Synchronous Digital Hierarchy (SDH)" and "Synchronous Optical Network (SONET) Transport Systems: Common Generic Criteria (A Module of TSGR, FR-440) Telcordia Technologies GR-253-CO E Issue 3, September 2000"), BIP-8 (Bit Interleaved Parity-8) is defined as a bit error monitoring method on a line, and a hitless protection switching method has using this BIP-8 arithmetic operation has been proposed and put to practical use.

Each VC path is provided with a POH (Path Overhead), and a B3 byte in the POH has a BIP-8 arithmetic operation result stored therein.

Figure 1:
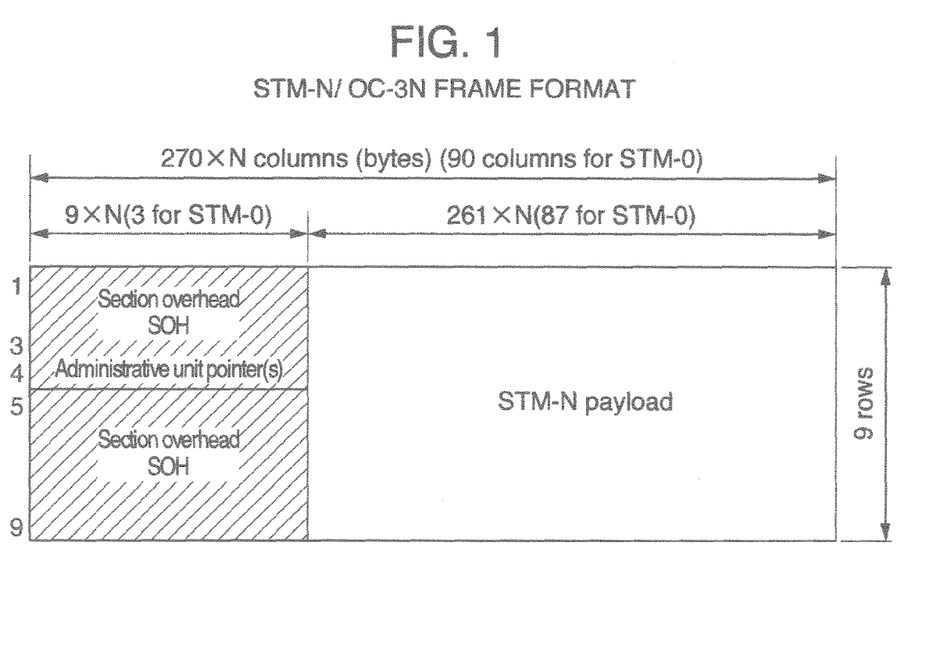
FIG 1 is a diagram for explaining the STM-N/OC-3N frame format.
Figure 2:
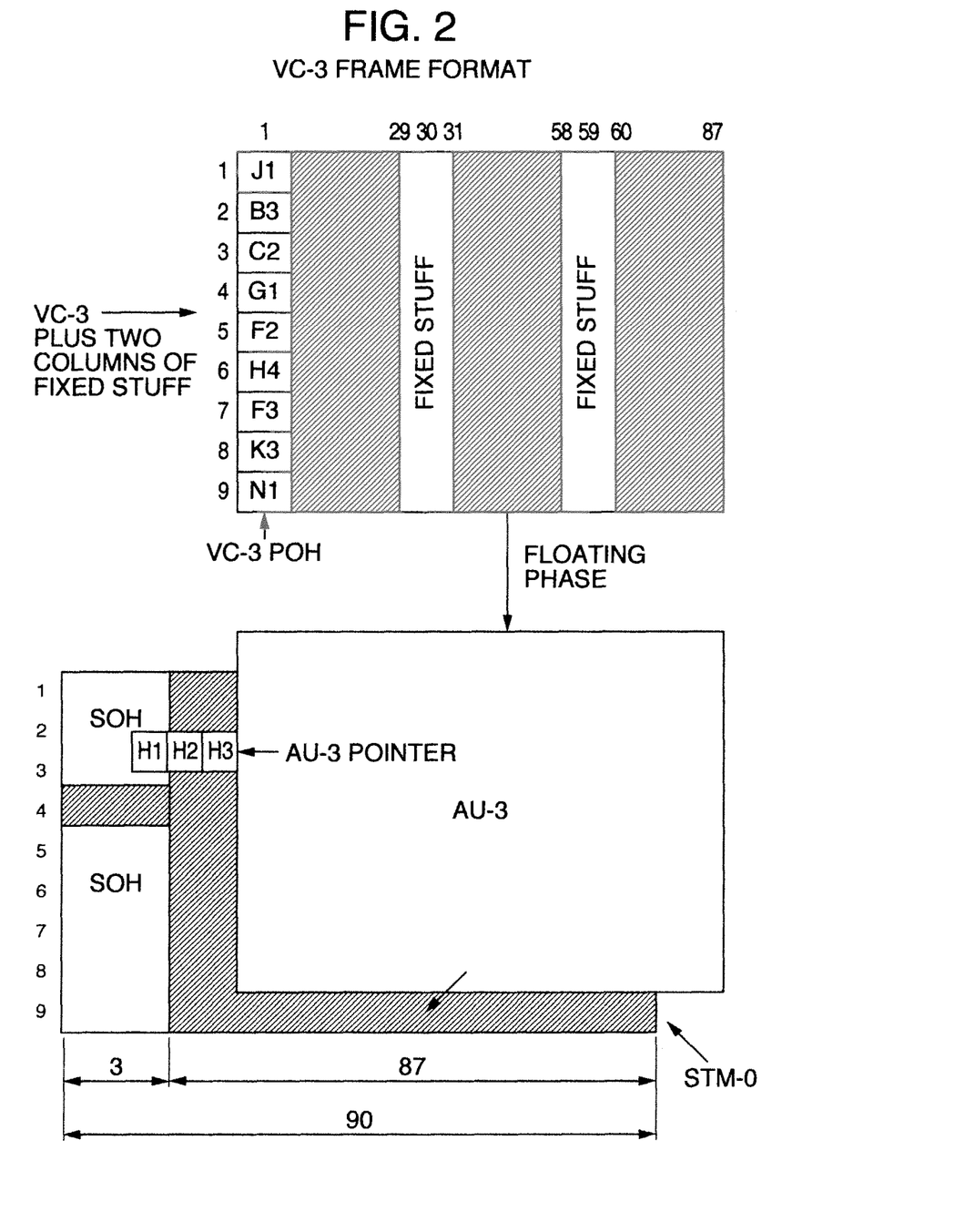
FIG. 2 is a diagram for explaining the VC-3 frame format.
Figure 3:
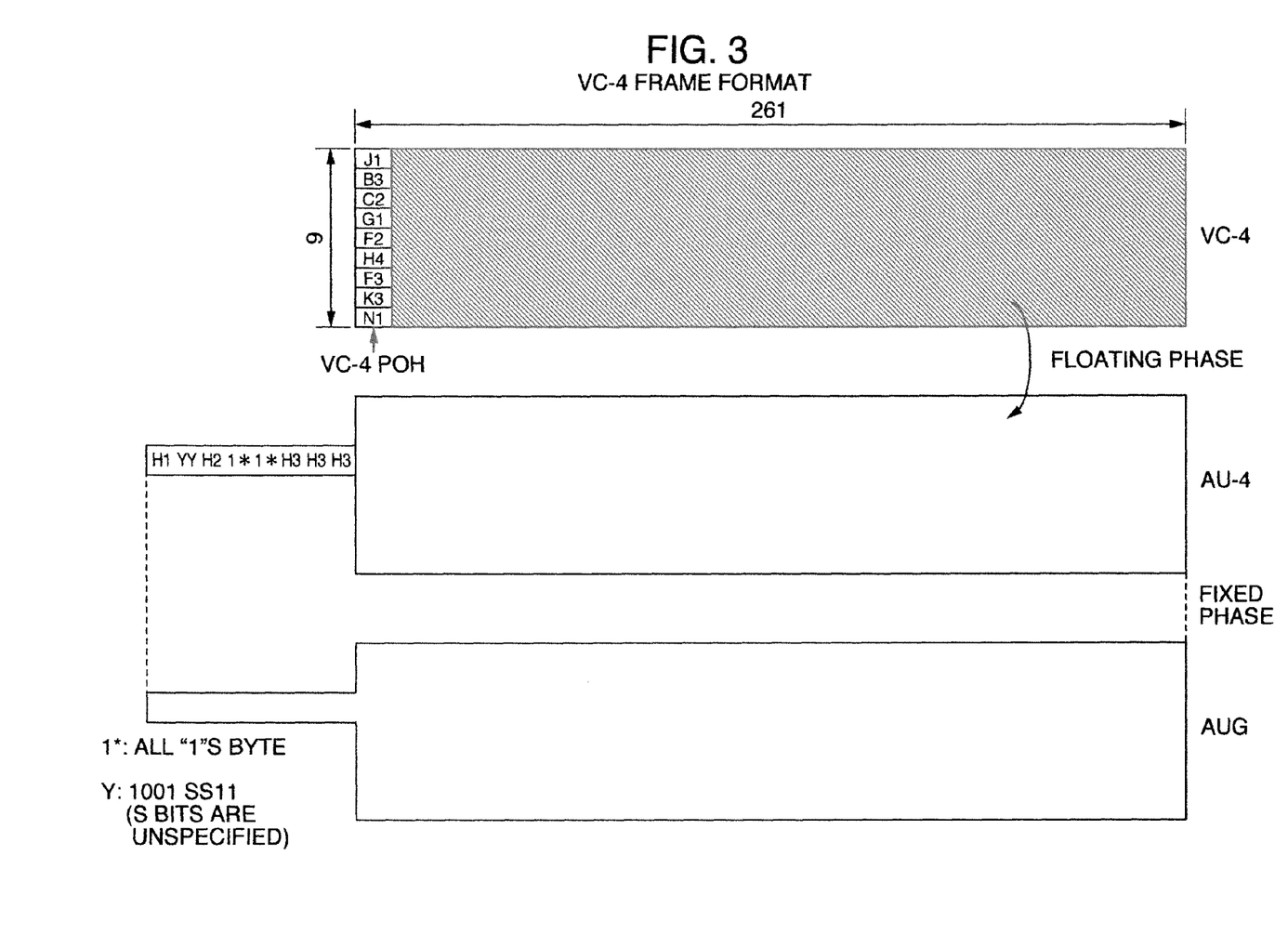
FIG. 3 is a diagram for explaining the VC-4 frame format.

The STM-N/OC-3N frame format in SDH/SONET is shown in FIG. 1. In multiplexing to the STM-N/OC-3N in SDH/SONET, a standardized multiplexing unit called VC is used and VC-3/VC-4 is prescribed. Low speed information is multiplexed in the VC. The VC-3 frame format is shown in FIG. 2, The VC-4 frame format is shown in FIG. 3.

Hereafter, the arithmetic operation method of BIP-8 will be described.

In the BIP-8, data to be monitored are assigned numbers 1 to 8 in the bit order from the head repeatedly and an even parity check is conducted on bit information pieces having the same number (the information pieces are called rail).

On the transmitter side, an even parity check is conducted on all bits in the VC path, and its result is stored in the B3 byte in the VC path to be transmitted next time.

On the receiver side, it is monitored whether there is a bit error in the VC path by conducting an even parity check on all received bits in the VC path and conducting comparison and collation with the value stored in the B3 byte in the VC path received next time.

The arithmetic operation result is stored in the next VC path, and this method is prescribed in "ITU-T G. 707 Synchronous Digital Hierarchy (SDH)" and "Synchronous Optical Network (SONET) Transport Systems: Common Generic Criteria (A Module of TSGR, FR-440) Telcordia Technologies GR-253-CORE Issue 3 (September 2000)".

SUMMARY OF THE INVENTION

In the conventional bit error detection scheme using the B3 byte prescribed in the SDH/SONET, i.e., using the BIP-8 arithmetic operation in the VC path, the even parity check is used as described in "BACKGROUND OF THE INVENTION." If an error of even number bits has occurred in the same rail, the bit error cannot be detected because of the nature of the even parity check. Therefore, a trigger for switching from the primary system to the backup system based on detection of a bit error is not obtained and hitless protection switching is not implemented.

Therefore, an object of the present invention is to securely detect a bit error which cannot be detected by the conventional BIP-8 arithmetic operation and conduct hitless protection switching of a VC path, in switching from the primary system to the backup system A network system according to the present invention is, as an example, a network system including a first terminal, a second terminal, a first communication control apparatus for communicating with the first terminal, a second communication control apparatus for communicating with the second terminal, and a first network and a second network installed in parallel between the first communication control apparatus and the second communication control apparatus, the first communication control apparatus including a first receiving processor for receiving a first SDH signal from the first terminal, a first arithmetic operator for conducting an error detecting arithmetic operation on a part of the first SDH signal to detect whether an error is included, and a packetizing processor for generating packetized data which includes at least a part of result information of the error detecting arithmetic operation, and the second communication control apparatus including a depacketizing processor for converting the packetized data supplied from the first network to depacketized data, a second arithmetic operator for conducting an error detecting arithmetic operation on a part of the depacketized data and a part of depacketized data to be processed by the depacketizing processor next time to detect whether an error is included, and a switcher for switching control of a primary system and a backup system on the first network and the second network when an error has been detected by the error detecting arithmetic operation. Here, the first arithmetic operator and the second arithmetic operator may conduct a first arithmetic operation and a second arithmetic operation which is an arithmetic operation method different from the first arithmetic operation, and the switcher may switch control of a primary system and a backup system on the first network and the second network when an error has been detected by the second arithmetic operation. Furthermore, the first arithmetic operation may be a BIP-8 arithmetic operation, and the second arithmetic operation may be a CRC arithmetic operation.

A network system according to the present invention is, as another example, a network system including a first terminal, a second terminal, a first communication control apparatus for communicating with the first terminal, a second communication control apparatus for communicating with the second terminal, and a first network and a second network installed in parallel between the first communication control apparatus and the second communication control apparatus, the first communication control apparatus including a first receiving processor for receiving a first SDH signal from the first terminal, a first BIP-8 arithmetic operator for conducting a BIP-8 arithmetic operation on a part of the first SDH signal, a first CRC arithmetic operator for conducting a CRC arithmetic operation on a part of the first SDH signal, and a packetizing processor for generating packetized data which includes a part of the first SDH signal and at least a part of result information of the CRC arithmetic operation, and the second communication control apparatus including a depacketizing processor for converting the packetized data supplied from the first network to depacketized data, a second BIP-8 arithmetic operator for conducting a BIP-8 arithmetic operation on a part of the depacketized data, a second CRC arithmetic operator for conducting a CRC arithmetic operation on a part of the depacketized data and a part of depacketized data to be processed by the depacketizing processor next time, and a switcher for switching control of a primary system and a backup system on the first network and the second network when an error has been detected by the CRC arithmetic operation. Here, the packetizing processor may insert result information of the BIP-8 arithmetic operation and result information of the CRC arithmetic operation respectively into different fields of the packetized data.

According to the present invention, it is possible to provide an apparatus capable of securely detecting a bit error which cannot be detected by the conventional BIP-8 arithmetic operation and switching a VC path to a backup line.

Other objects, features and advantages of the invention will become apparent from the following description of the embodiments of the invention taken in conjunction with the accompanying drawings.

DESCRIPTION OF THE EMBODIMENTS

Hereafter, representative embodiments of the present invention will be described with reference to the drawings.

Figure 4:
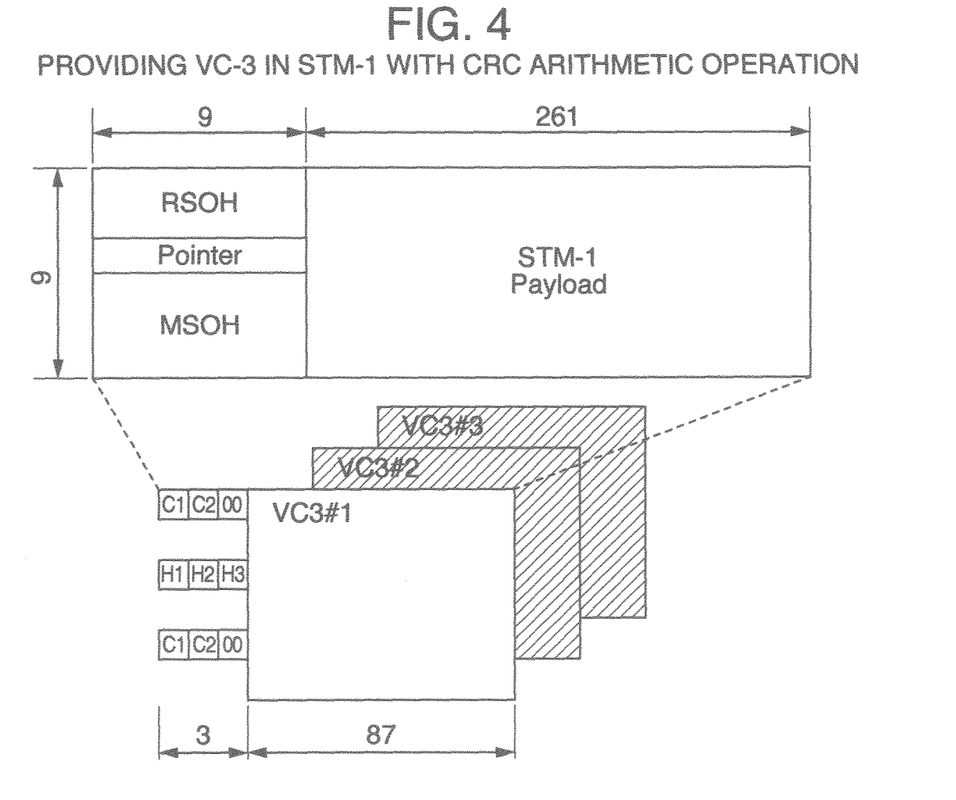
FIG. 4 is a diagram for explaining providing the VC-3 in the STM-1 with CRC-32 arithmetic operation.

First, in the present embodiment, the VC path is provided with CRC arithmetic operation besides the BIP-8 arithmetic operation. Here, the CRC arithmetic operation is Cyclic Redundancy Check arithmetic operation. The CRC arithmetic operation is a kind of function which is supplied with a data stream having an arbitrary length as its input and which outputs a value having a fixed size such as, for example, 32 bit integer. The CRC arithmetic operation is arithmetic operation of an error detection code for detecting consecutive errors. As the CRC arithmetic operation, a CRC-16 arithmetic operation, a CRC-32 arithmetic operation and so on can be mentioned. In the present embodiment, an example using CRC-32 arithmetic operation having a higher precision will be described. FIG. 4 shows a frame format obtained by adding a CRC arithmetic operation area to the VC-3 in STM-1 (synchronous transport module which is a multiplexing unit of SDH), Three VC-3s are mapped to the STM-1, and each VC-3 inclusive of a pointer part (H1, H2 and H3) is packetized. Therefore, three bytes are added to the row 1 and row 7. Four bytes (C1 to C4) which are inserted areas of the CRC-32 arithmetic operation result are assigned to the added bytes, The transmitter side conducts the CRC-32 arithmetic operation on an H3 byte and the whole area of the VC-3 (i.e., a stuff byte in an AU pointer part and a payload part), and inserts a result of the arithmetic operation into C1 to C4 which are CRC-32 arithmetic operation result storage areas of the VC-3 to be transmitted next time The H3 byte is a stuff byte used to absorb a phase difference of the VC-3 data between the transmitter side and the receiver side. Since the VC-3 data is stored, the H3 byte is included in the CRC-32 arithmetic operation area.

The receiver side makes a decision whether there is a bit error by conducting CRC-32 arithmetic operation on the received H3 byte and whole area of the VC-3 (i.e., the stuff byte in the AU pointer part and the payload part) and comparing a result of the CRC-32 arithmetic operation with C1 to C4 which are the received CRC-32 arithmetic operation result concerning the VC-3. The H3 byte is a stuff byte used to absorb a phase difference of the VC-3 data between the transmitter side and the receiver side. Since the VC-3 data is stored, the H3 byte is included in the CRC-32 arithmetic operation area.

The CRC-32 arithmetic operation result is stored in the next VC-3. This is conducted by using the same method as that used in the BIP-8 arithmetic operation prescribed in "ITU-T G 707 Synchronous Digital Hierarchy (SDH)" and "Synchronous Optical Network (SONET) Transport Systems: Common Generic Criteria (A Module of TSGR, FR-440) Telcordia Technologies GR-253-CORE Issue 3 September 2000".

Figure 5:
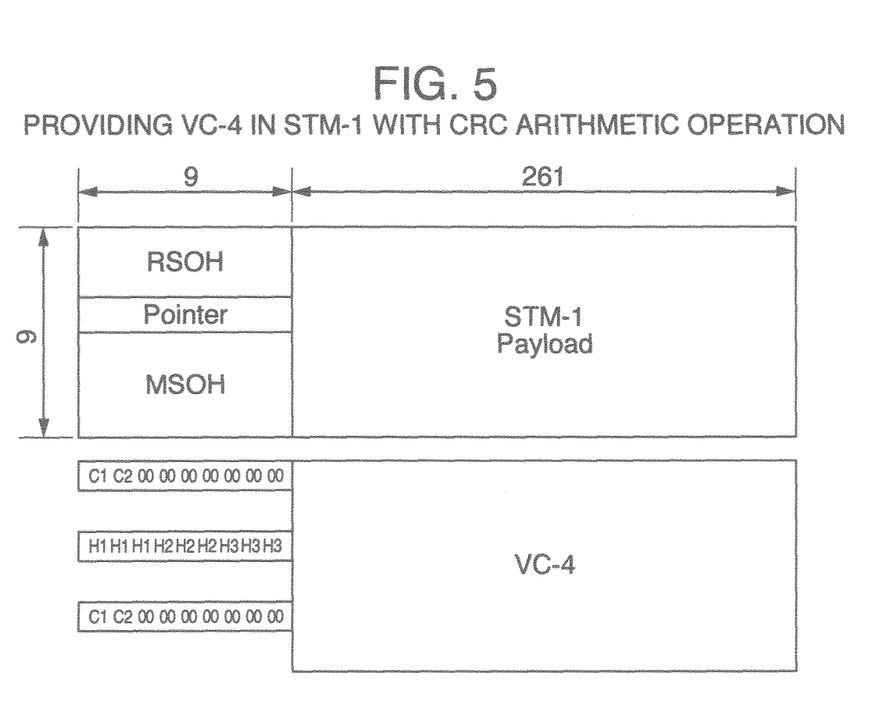
FIG. 5 is a diagram for explaining providing the VC-4 in the STM-1 with CRC-32 arithmetic operation.

FIG. 5 shows a frame format obtained by adding a CRC arithmetic operation area to the VC-4 in the STM-1. Since packetization is conducted with a pointer part (H1, H2 and H3) included, nine bytes are added to row 1 and row 7 Four bytes (C1 to C4) of the CRC-32 arithmetic operation result insertion area are assigned to the added bytes.

The transmitter side conducts the CRC-32 arithmetic operation on an H3 byte and the whole area of the VC-4 (i.e., a stuff byte in an AU pointer part and a payload part), and inserts a result of the arithmetic operation into C1 to C4 which are CRC-32 arithmetic operation result storage areas of the VC-4 to be transmitted next time.

The receiver side makes a decision whether there is a bit error by conducting CRC-32 arithmetic operation on the received H3 byte and whole area of the VC-4 (i.e., the stuff byte in the AU pointer part and the payload part) and comparing a result of the CRC-32 arithmetic operation with C1 to C4 which are the received CRC-32 arithmetic operation result concerning the VC-4, The CRC-32 arithmetic operation result is stored in the next VC-4. This is conducted by using the same method as that used in the BIP-8 arithmetic operation prescribed in "ITU-T G. 707 Synchronous Digital Hierarchy (SDH)" and "Synchronous Optical Network (SONET) Transport Systems: Common Generic Criteria (A Module of TSGR, FR-440) Telcordia Technologies GR-253-CORE Issue 3 September 2000".

Figure 6:
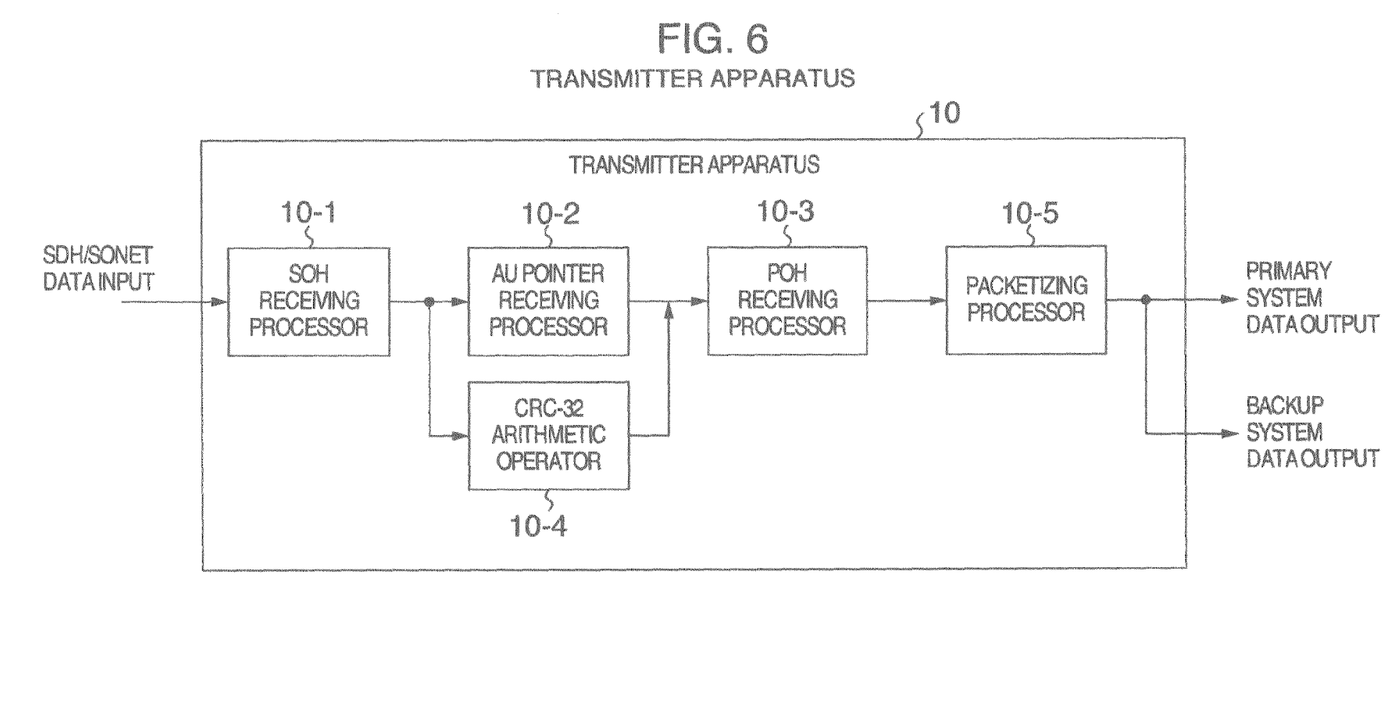
FIG. 6 is a diagram for explaining an example of a transmitter apparatus which provides VC data with CRC-32 arithmetic operation.

FIG. 6 shows a transmitter apparatus (10): Hereafter, operations of respective processors will be described.

An SOH receiving processor (10-1) establishes synchronization to STI NIOC3N received data, and conducts SOH terminating processing and alarm detection.

An AU pointer receiving processor (10-2) conducts termination of an AU pointer and provision of a transmission AU pointer.

A POH receiving processor (10-3) conducts POH terminating processing. Here, first error detecting arithmetic operation is conducted to detect whether data information in received VC data which is finished in POH terminating processing includes an error. Specifically, the BIP-8 arithmetic operation is conducted. It is monitored whether there is a bit error in received VC data by conducting comparison with the B3 byte in the VC data received next time.

On the other hand, a CRC-32 arithmetic operator (10-4) conducts second error detecting arithmetic operation to detect whether data information in the payload includes an error. Specifically, the CRC-32 arithmetic operator (10-4) conducts the CRC-32 arithmetic operation on the H3 byte and the whole area of the VC data (i.e., a stuff byte in the AU pointer part and the payload part), and compares a result of the arithmetic operation with C1 to C4 bytes in VC data received next time.

In the case of an example described later in which the embodiment is applied to an MPLS (Multi Protocol Label Switching) network which is used as a specific network configuration, result information of the second error detecting arithmetic operation can be inserted as C1 to C4 bytes which become a packet length adjustment area of packetized data. In this case, the packet length is adjusted on the basis of result information of the second error detecting arithmetic operation. In this case, consequently result information of the first error detecting arithmetic operation and the result information of the second error detecting arithmetic operation are inserted respectively into different fields of packetized data.

The VC data subjected to the receiving processing and provided with the CRC-32 arithmetic operation is provided with a header and packetized (IP packetized) to obtain packetized data in a packetizing processor (10-5). A redundant configuration of the network is formed by transmitting the same data to the primary system and the backup system.

Figure 7:
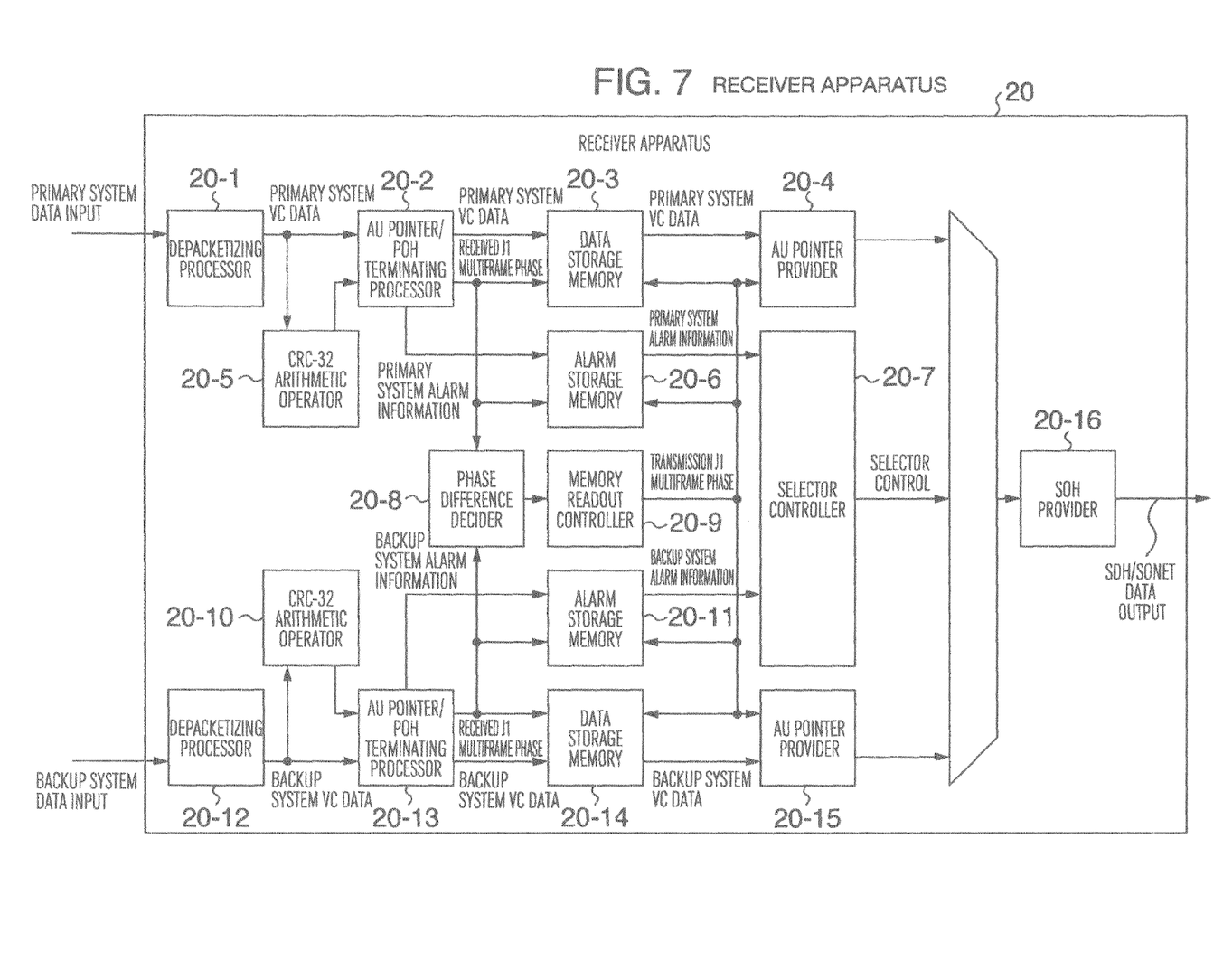
FIG. 7 is a diagram for explaining an example of a receiver apparatus which conducts hitless protection switching on the basis of CRC-32 arithmetic operation with which VC data is provided.

FIG. 7 shows a receiver apparatus (20).

In the receiver apparatus (20), hitless protection switching from a primary system to a backline system is conducted. The hitless protection switching is implemented by storing primary system received data and backup system received data into a memory temporarily and reading the primary system received data and backup system received data from the memory with an aligned phase difference. The receiver apparatus has a configuration in which a selector is switched to the backup system if there is a bit error in the primary system received data.

Hereafter, operations in respective processors will be described.

Depacketizing processors (20-1) and (20-12) terminate received data and convert the received data to the VC data (reconstruct the VC data from the received data).

AU pointer terminating processors (20-2) and (20-13) conduct AU pointer termination.

POH terminating processors (20-2) and (20-13) conduct 64 multiframe synchronization of a J1 byte and write received VC data into data storage memories (20-3) and (20-14) with a received J1 multiframe phase. The POH terminating processors conduct first error detecting arithmetic operation to detect whether data information in received VC data subjected to POH terminating processing includes an error. Specifically, the POH terminating processors detect whether there is a bit error by conducting the BIP-8 arithmetic operation and conducting comparison with the B3 byte in VC data received next time.

CPU-32 arithmetic operators (20-5) and (20-10) conduct second error detecting arithmetic operation to detect whether data information in the payload includes an error. Specifically, the CPU-32 arithmetic operators detect whether there is a bit error which cannot be detected by using the BIP-8 by conducting CRC-32 arithmetic operation on the received H3 byte and whole area of the VC data (i.e., a part of stuff bytes in the AU pointer part and the payload part) and conducting comparison with C1 to C4 byte values in the VC data received next time.

Bit error information detected by the BIP-8 arithmetic operation in the POH terminating processors (20-2) and (20-13) and bit error information detected in the CPU-32 arithmetic operators (20-5) and (20-10) are written into alarm storage memories (20-6) and (20-11) with the received J1 multiframe phase.

A phase difference decider (20-8) makes a decision as to the phase difference between the primary system and the backup system on the basis of received J1 multiframe phases of the primary system and the backup system, and fixes a transmission phase. AU pointer providers (20-4) and (20-15) generate a J1 multiframe phase and a transmission pointer according to the fixed transmission phase.

The fixed transmission phase is reported to a memory readout controller (20-9) and the memory readout controller controls the operation of readout from data storage memories (20-3) and (20-14) based on the fixed transmission phase. The phase difference between the primary system and the backup system is absorbed by reading out the VC data from the data storage memories (20-3) and (20-14) with the fixed transmission phase.

Furthermore, the memory readout controller (20-9) absorbs the phase difference of the detected alarm between the primary system and the backup system by reading out the alarm information from the alarm storage memories (20-6) and (20-11) with the fixed transmission phase. A system switching factor is generated and a notice thereof is given to a selector controller (20-7).

The data storage memories (20-3) and (20-14) can absorb detection time required for bit error detection which is made possible by error detecting arithmetic operation of the next consecutive VC data by storing received VC data. In other words, the data storage memories have a function of absorbing the time required to compare two consecutive received data. And when a bit error is detected in the primary system received data as a result of bit error detection which is made possible by error detecting arithmetic operation of the next consecutive VC data, the selector controller (20-7) switches a selector to the backup system. Primary system data or backup system data selected by the selector is provided with an SOH in an SOH provider (20-16) to reconstruct STM-N/OC-3N data.

As an example of a specific network configuration using the transmitter apparatus (10) and the receiver apparatus (20), application to an MPLS (Multi Protocol Label Switching) network will be described. By the way, the network configuration is not limited to the present embodiment, but it is also possible to form the network by using an existing VC path line.

Figure 8:
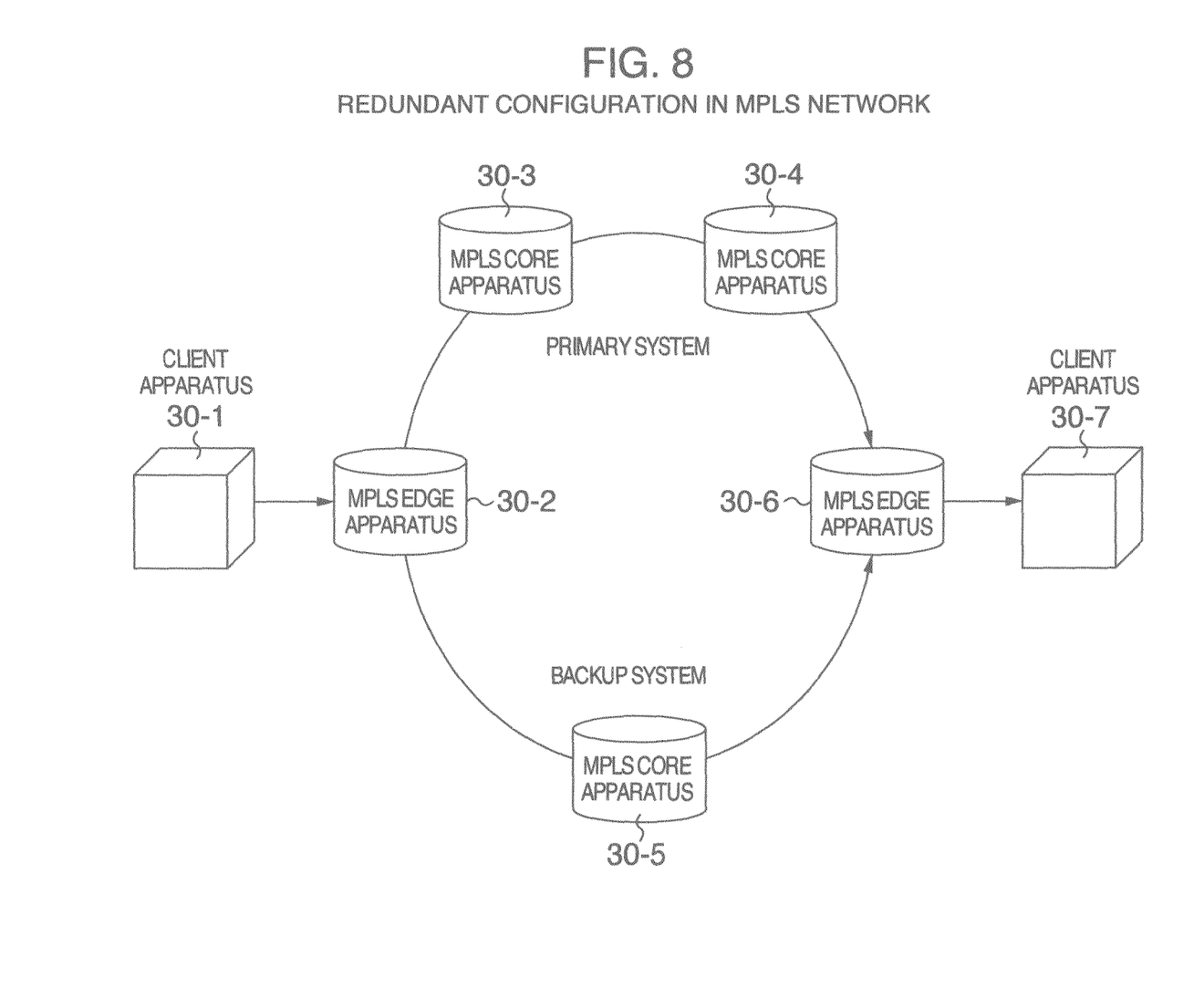
FIG. 8 is a diagram for explaining an example of a redundant configuration in an MPLS network to which the transmitter apparatus and the receiver apparatus are applied.

FIG. 8 shows a redundant configuration in the MPLS network.

An MIPLS edge apparatus (30-2) corresponds to the transmitter apparatus (10) shown in FIG. 6, and an MPLS edge apparatus (30-6) corresponds to the receiver apparatus (20) shown in FIG. 7.

The MPLS edge apparatus (30-2) conducts the BIP-8 arithmetic operation on an SDH/SONET signal supplied from a client apparatus (30-1) by taking a VC as the unit, further conducts the CRC-32 arithmetic operation, provides the signal with information of its result, then provides the signal with an MPLS header, and conducts MPLS packetization.

As for the MPLS packet signal, the same signal is transmitted to the primary system and the backup system, and passed through MPS core apparatuses (relay apparatuses) (30-3), (30-4) and (30-5) to arrive at the MPLS edge apparatus (30-6). The MPLS edge apparatus (30-6) monitors a bit error by using the BIP-8 arithmetic operation and the CRC-32 arithmetic operation. If a bit error has occurred in the primary system, switching to a backup system signal is executed with hitless protection.

Figure 9:
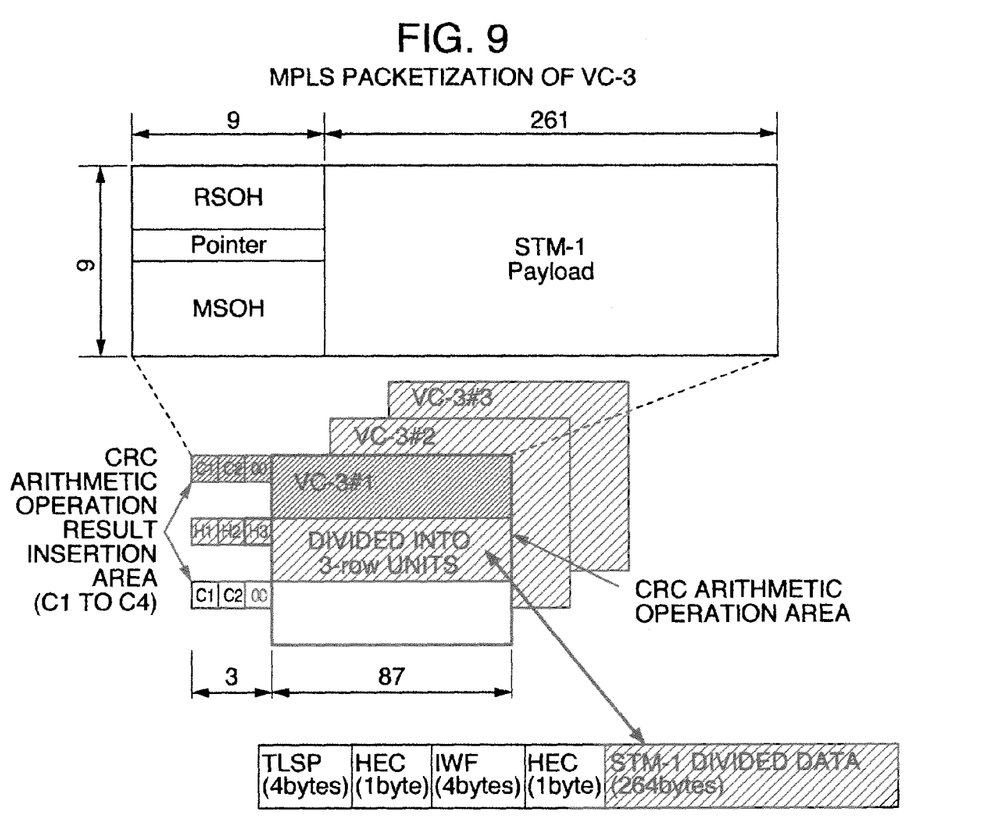
FIG. 9 is a diagram for explaining MPLS packetization of a VC-3 provided with a result of CRC-32 arithmetic operation.

FIG. 9 shows MPLS packetization of VC-3 in the MPLS edge apparatus. In FIG. 9, STM-1 is taken as an example. In the STM-1, three VC-3s are mapped. After the result of the CRC-32 arithmetic operation is stored, each VC-3 is divided by taking three rows as the unit and stored into a data area of an MPLS packet, The delay caused at the time of the MPLS packetization is shortened by dividing the VC-3 into three-row units.

An MPLS packet shown in FIG. 9 is provided with a TLSP (Tunnel Label Switching Protocol) for label switch a HEC (Header Error Control) for TLSP error correction, an IWF header to be used when MPLS-packetizing the SDH/SONET, and a HEC for IWF header error correction. Herein, the TLSP, the HEC for TLSP error correction. the IWF header, and the HEC for IWF header error correction are referred to as MPLS header collectively.

Figure 10:
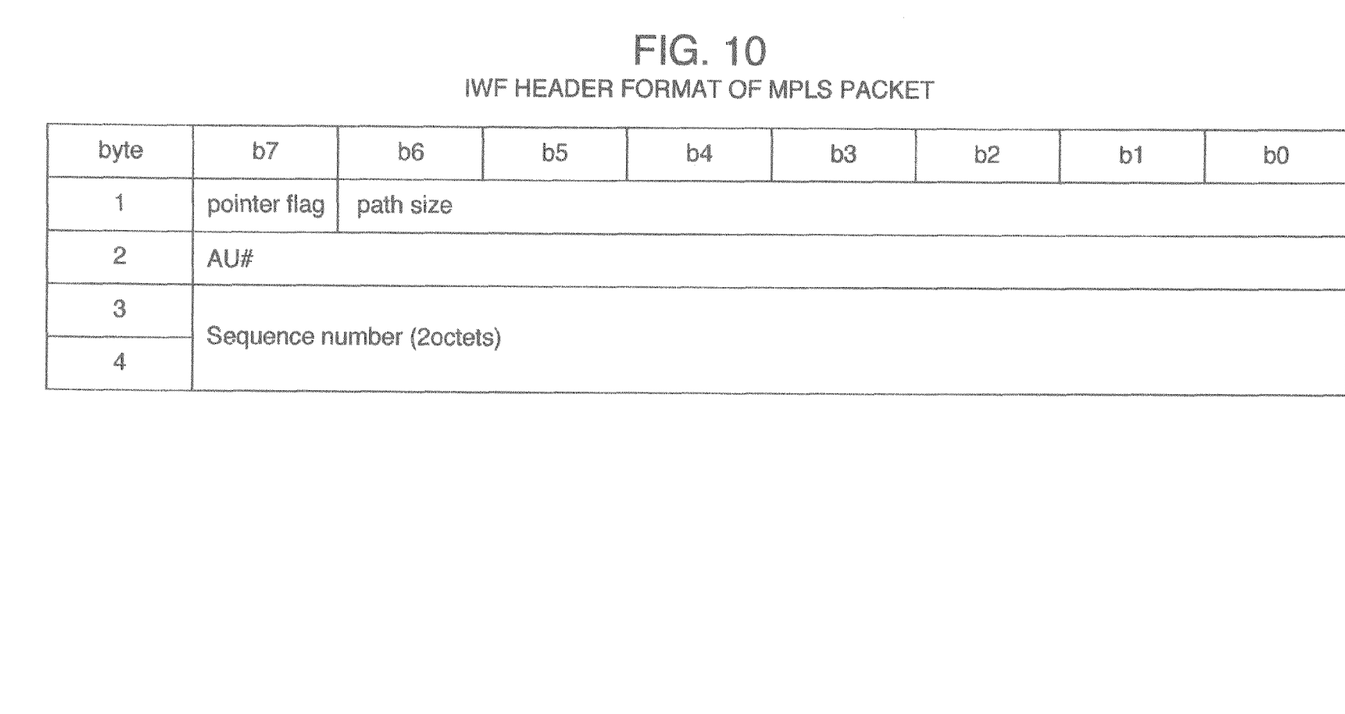
FIG. 10 is a diagram for explaining an IWF header format of an MPLS packet.

FIG. 10 shows an IWF header format.

Figure 11:
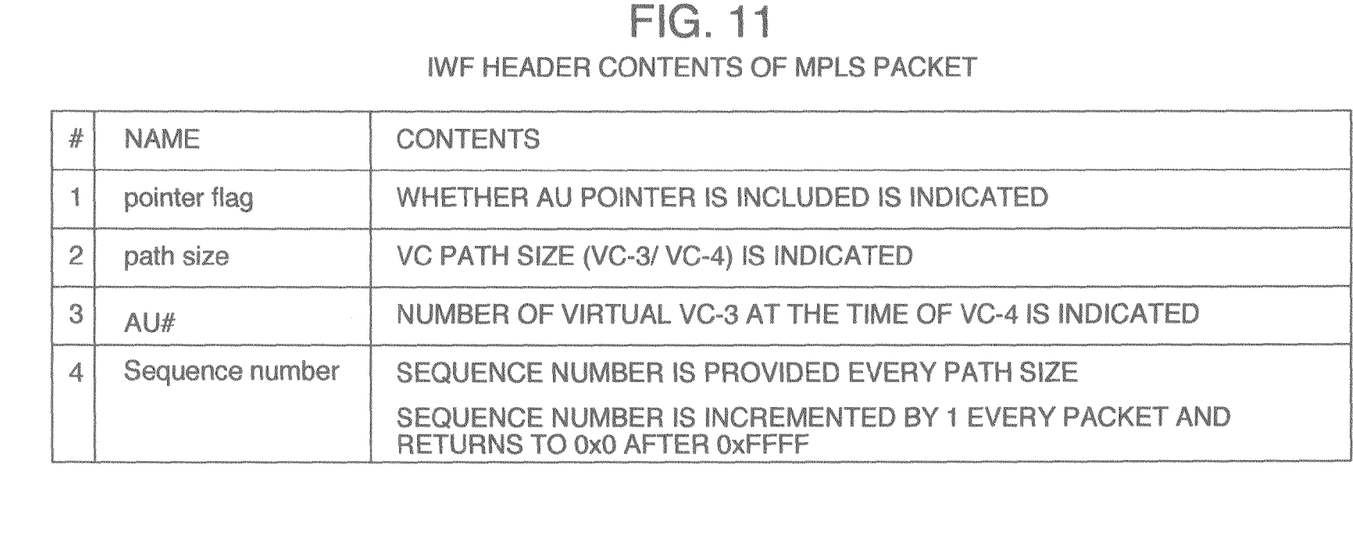
FIG. 11 is a diagram for explaining IWF header contents of the MPLS packet.

FIG. 11 shows IWF header contents. Each of the three-row units obtained by dividing the VC data is provided with an IWF header. It becomes possible in the receiver apparatus to reconstruct the VC data from the MPLS packets by storing information concerning the AU pointer and information concerning the VC. Information representing whether an AU pointer is included is stored in a pointer flag area. A VC path size is stored in a path size area to determine whether the VC is VC-3 or VC-4. A virtual VC-3 number at the time when the VC is a VC-4 is stored in an AU# area. In addition, a sequence number which increments by +1 with a packet taken as the unit is provided in a sequence number area. The sequence number is used to confirm the consecutiveness of MPLS packets when reconstructing the VC data.

Figure 12:
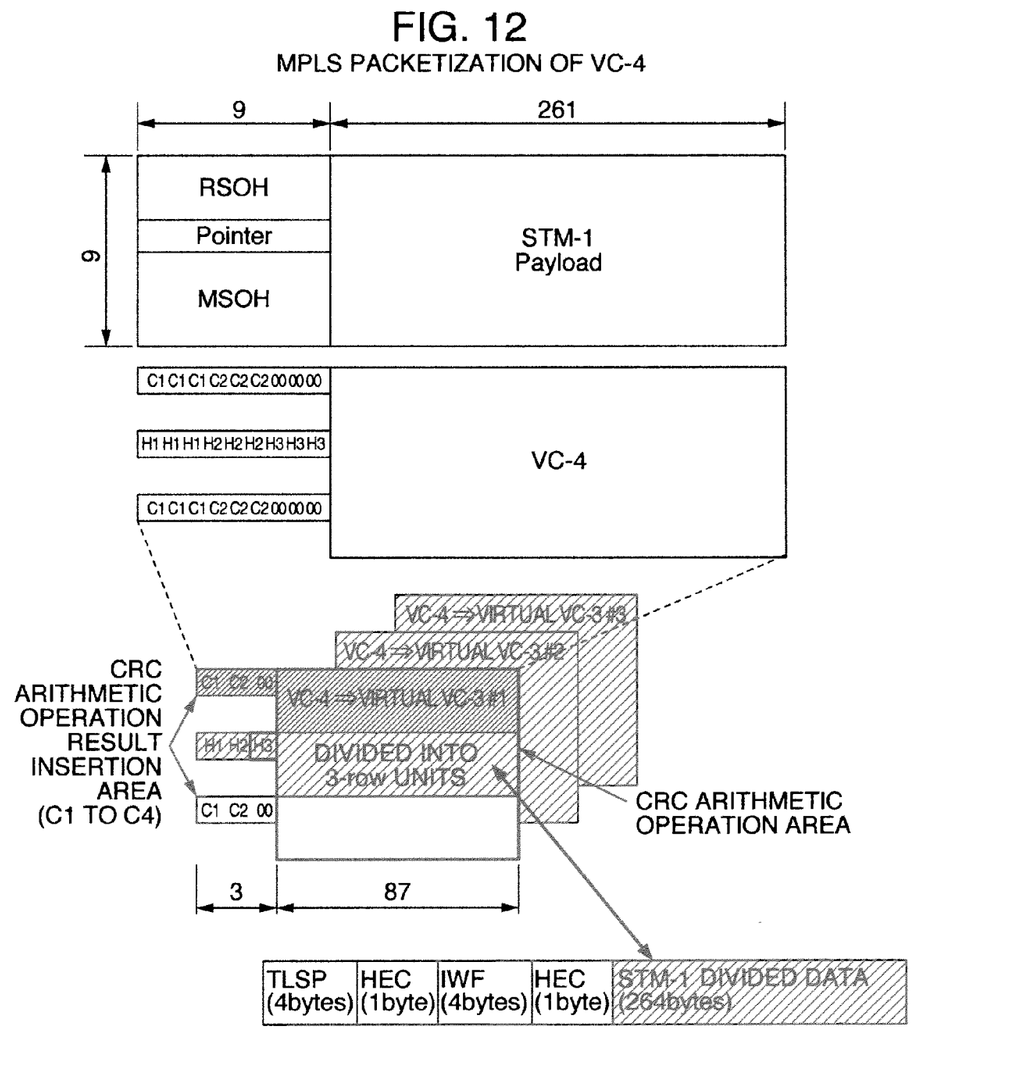
FIG. 12 is a diagram for explaining MPLS packetization of a VC-4 provided with a result of CRC-32 arithmetic operation.

FIG. 12 shows MPLS packetization of the VC-4 in the MPLS edge apparatus. In FIG. 12, the STM-1 is taken as an example. The processing on the VC-4 is the same as the processing on the VC-3 except that the packet length is unified with that obtained when the VC-3 is MPLS-packetized as shown in FIG. 9 by dividing each virtual VC-3 with three rows taken as the unit and storing resultant data into a data area of an MPLS packet. In the case where hitless protection switching is anticipated in the VC path communication network when a fault has occurred, the bit error detection method using the BIP-8 arithmetic operation atone cannot secure certainty of the bit error detection and cannot secure certainty of correction because a switching trigger from the primary system to the backup system is not applied, resulting in a possibility that hitless protection switching will not be executed.

In the present embodiment, it is possible to detect a bit error certainly and conduct hitless protection switching of VC paths by providing a VC unit with result information of the CRC-32 arithmetic operation. As a result, a highly reliable network can be provided not only in a conventional VC path communication network but also in the MPLS network which is expected to be spread more and more from now on.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A network system comprising a first terminal, a second terminal, a first communication control apparatus for communicating with the first terminal, a second communication control apparatus for communicating with the second terminal, and a first network and a second network installed in parallel between the first communication control apparatus and the second communication control apparatus,
the first communication control apparatus comprising:
a first receiving processor for receiving a first SDH signal from the first terminal,
a first arithmetic operator for conducting an error detecting arithmetic operation on a part of the first SDH signal to detect whether an error is included; and
a packetizing processor for generating packetized data which includes at least a part of result information of the error detecting arithmetic operation, and
the second communication control apparatus comprising:
a depacketizing processor for converting the packetized data supplied from the first network to depacketized data;
a second arithmetic operator for conducting an error detecting arithmetic operation on a part of the depacketized data and a part of depacketized data to be processed by the depacketizing processor next time to detect whether an error is included; and
a switcher for switching control of a primary system and a backup system on the first network and the second network when an error has been detected by the error detecting arithmetic operation.

2. The network system according to claim 1, wherein the first arithmetic operator and the second arithmetic operator conduct a first arithmetic operation and a second arithmetic operation which is an arithmetic operation method different from the first arithmetic operation, and
the switcher switches control of a primary system and a backup system on the first network and the second network when an error has been detected by the second arithmetic operation.

3. The network system according to claim 2, wherein the first arithmetic operation is a BIP-8 arithmetic operation and the second arithmetic operation is a CRC arithmetic operation.

4. The network system according to claim 2, wherein the first arithmetic operation is a BIP-8 arithmetic operation and the second arithmetic operation is a CRC 32 arithmetic operation.

5. The network system according to claim 1, wherein the packetizing processor inserts result information of the first arithmetic operation and result information of the second arithmetic operation respectively into different fields of the packetized data 6. The network system according to claim 1, wherein the packetizing processor divides a part of the first SDH signal, provides each of signals obtained by the division with a header, and thereby generates the packetized data 7. The network system according to claim 6, wherein the depacketizing processor conducts reconfiguration on a plurality of the packetized data supplied from each of the first network and the second network, and thereby forms depacketized data 8. The network system according to claim 6, wherein the packetizing processor adjusts a packet length by using at least a part of result information of the second arithmetic operation, and thereby generates the packetized data 9. The network system according to claim 1, further comprising a relay apparatus for communicating with the first communication control apparatus,
wherein the first communication control apparatus transmits the packetized data to the relay apparatus, 10. A network system comprising a first terminal, a second terminal, a first communication control apparatus for communicating with the first terminal, a second communication control apparatus for communicating with the second terminal, and a first network and a second network installed in parallel between the first communication control apparatus and the second communication control apparatus,
the first communication control apparatus comprising:
a first receiving processor for receiving a first SDH signal from the first terminal;
a first BIP-8 arithmetic operator for conducting a BIP-8 arithmetic operation on a part of the first SDH signal;
a first CRC arithmetic operator for conducting a CRC arithmetic operation on a part of the first SDH signal; and
a packetizing processor for generating packetized data which includes a part of the first SDH signal and at least a part of result information of the CRC arithmetic operation, and the second communication control apparatus comprising:
a depacketizing processor for converting the packetized data supplied from the first network to depacketized data,
a second BIP-8 arithmetic operator for conducting a BIP-8 arithmetic operation on a part of the depacketized data;
a second CRC arithmetic operator for conducting a CRC arithmetic operation on a part of the depacketized data and a part of depacketized data to be processed by the depacketizing processor next time, and
a switcher for switching control of a primary system and a backup system on the first network and the second network when an error has been detected by the CRC arithmetic operation.

11. The network system according to claim 10, wherein the packetizing processor inserts result information of the BIP-8 arithmetic operation and result information of the CRC arithmetic operation respectively into different fields of the packetized data 12. The network system according to claim 10, wherein the packetizing processor divides a part of the first SDH signal, provides each of signals obtained by the division with a header, and thereby generates the packetized data 13. The network system according to claim 12, wherein the depacketizing processor conducts reconfiguration on a plurality of the packetized data supplied from each of the first network and the second network, and thereby forms depacketized data 14. The network system according to claim 12, wherein the packetizing processor adjusts a packet length by using at least a part of result information of the CRC arithmetic operation, and thereby generates the packetized data.

* * * * *